United States Patent [19]

Nomura et al.

[11] 4,296,306

[45] Oct. 20, 1981

[54] METHOD OF WELDING CORRUGATED METALLIC MATERIALS

[75] Inventors: Hirokazu Nomura; Tadashi Fujioka, both of Tsu, Japan

[73] Assignee: Nippon Kokan Kabushiki Kaisha, Tokyo, Japan

[21] Appl. No.: 75,165

[22] Filed: Sep. 12, 1979

[30] Foreign Application Priority Data

Sep. 29, 1978 [JP] Japan .................................. 53-119264

[51] Int. Cl.³ ............................................. B23K 9/12
[52] U.S. Cl. ........................... 219/124.34; 219/124.32; 219/124.33; 219/137 R
[58] Field of Search ...................... 219/124.02, 124.03, 219/124.1, 124.22, 124.32, 124.33, 124.34, 137 R

[56] References Cited

U.S. PATENT DOCUMENTS

| | | | |
|---|---|---|---|
| 2,927,195 | 3/1960 | Arnaud | 219/124.32 |
| 3,373,914 | 3/1968 | Wall, Jr. | 219/124.22 |
| 3,443,732 | 5/1969 | Wall, Jr. et al. | 219/124.34 |
| 4,008,384 | 2/1977 | Cecil | 219/124.32 |

FOREIGN PATENT DOCUMENTS

| | | |
|---|---|---|
| 633265 | 7/1936 | Fed. Rep. of Germany ......................... 219/124.34 |
| 642435 | 3/1937 | Fed. Rep. of Germany ......................... 219/124.34 |
| 52-111847 | 9/1977 | Japan . |

Primary Examiner—C. C. Shaw
Attorney, Agent, or Firm—Fleit & Jacobson

[57] ABSTRACT

In an automatic arc welding method for welding metallic materials having a vertically curved weld line, a change in the arc voltage is compared with a arc length setting voltage and the resulting difference signal is used to control the vertical position of a welding torch and hold the same at a predetermined distance from the materials to be welded, while on the other hand in response to a signal generated from an obliquity detector made integral with the torch, the torch is controlled at an angle corresponding to the oblique angle of the materials to be welded and at the same time the welding speed is controlled at a constant value in response to a signal corresponding to the torch angle.

1 Claim, 6 Drawing Figures

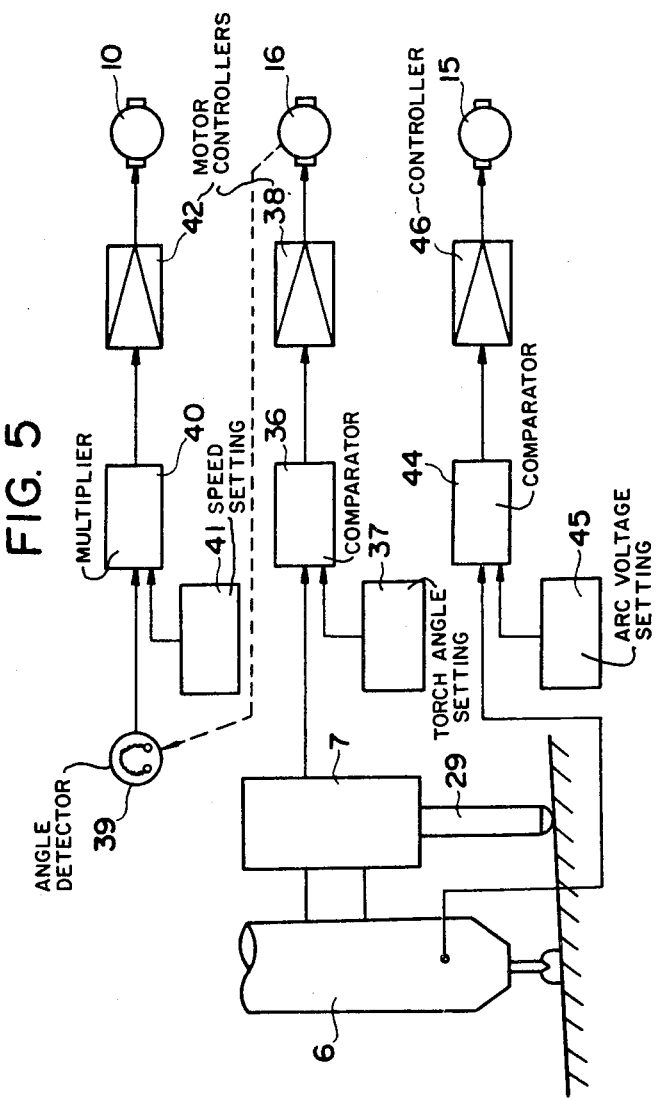

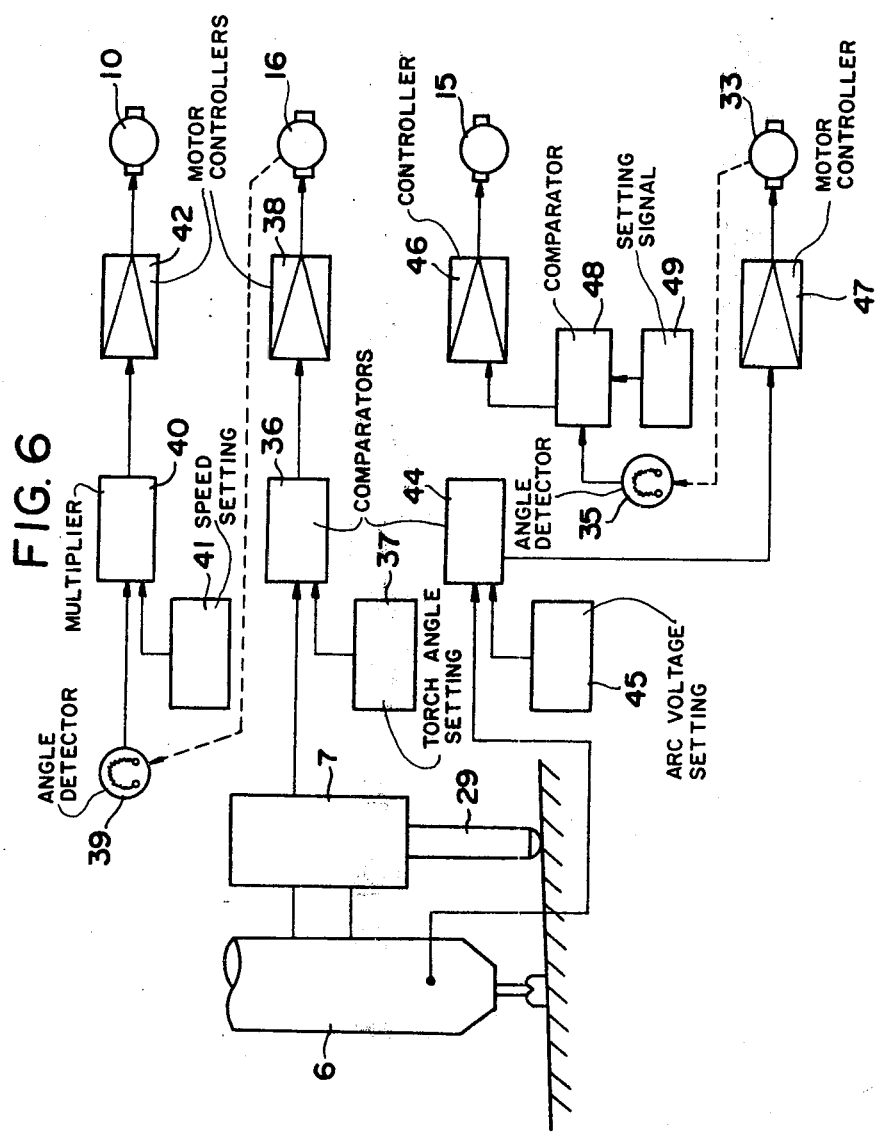

METHOD OF WELDING CORRUGATED METALLIC MATERIALS

BACKGROUND OF THE INVENTION

The present invention relates to an automatic arc welding method for welding metallic materials having a vertically curved weld line, and more particularly the invention relates to a control method for such welding method.

In the automatic arc welding, the welding must be performed by maintaining the arc length constant irrespective of the flat and arcuated portions of metals to be welded, that is, holding the welding torch at practically a fixed position from the surface of the metals and also at a fixed oblique angle, vertically in many instances, with respect to the surface to be welded and maintaining the linear speed of the welding torch tip at a desired value.

In the past, many different control methods have been proposed for the automatic arc welding of metals having arcuate portions and these methods may be divided into two broad groups, i.e., program control systems and profiling control systems. The program control systems are shown, for example, in U.S. Pat. No. 4,008,384. Such control systems are designed so that the contour of convoluted surfaces to be welded is preliminarily analyzed and the command values representing the angles at which the welding torch is to be positioned are stored on a cam, NC memory device or the like from which the command values are reproduced as the welding is proceeded, and such control systems are disadvantageous in that the required storage and reproduction circuits are generally complicated and high in cost. Also, if the materials to be welded are deformed by the application of pressure during the fitting operation or by the heat during the welding so that the materials change from their initially stored shapes, this will make it difficult to position the welding torch at the proper angle. It is also essential that the positioning of the welding apparatus and the materials relative to each other is accomplished with a high degree of accuracy each time the welding is performed.

On the other hand, profiling control systems are shown, for example, in Japanese Laid-Open Patent Publication No. 52-111847. This system employs two styli which detect the inclination in the direction of the weld line in terms of a difference in height and this difference is converted through an arm into an amount of rotation of a pin which in turn is converted into an electric quantity by a resolver. A torch tilting motor is controlled in a manner that the detected amount of inclination is always reduced to zero and in this way the welding torch is held substantially normal to the sheets to be welded.

However, this type of system requires the use of two styli and a mechanism for detecting the difference in height between the styli with a high degree of accuracy. Also, the sensor as a whole must be held at a predetermined height from the surface to be welded and consequently a vertical motor is controlled by detecting the vertical position with a differential transformer. In any way, a highly precise mechanical system must be used so as to transmit a very small difference between the styli and it is necessary to use the two high precision resolvers as well as the two high precision differential transformer. As a result, the sensor tends to be rigid and bulky and this is detrimental from the standpoint of reducing the weight and size of the apparatus.

SUMMARY OF THE INVENTION

It is therefore the object of the invention to provide a welding method whereby the welding can be accomplished while ensuring a predetermined oblique angle and welding arc length for the welding torch and a desired linear speed for the welding torch tip by means of an apparatus which is relatively simple, light in weight and small in size and a simple mechanism.

In accordance with the invention there is thus provided a method of welding corrugated or curved metallic materials of a type in which the welding of materials is accomplished by vertically movably mounting a lifting block on a welding apparatus proper which is horizontally movable over a track extended along the weld line and mounting on the lifting block a rotating block including a welding torch. The method comprises the steps of comparing a change in the arc voltage with a arc length setting voltage to control a lifting block drive motor in response to the resulting difference signal so as to maintain constant the distance between the materials to be welded and the torch, controlling a rotating block drive motor in response to a signal from an obliquity detector made integral with the torch to position the torch at an angle corresponding to the oblique angle of the materials to be welded and also controlling a welding apparatus proper traversing motor in response to a signal corresponding to the torch angle to maintain the welding speed at a constant value. There is further provided an arc length control motor for moving the torch and the obliquity detector which are integrally mounted on the rotating block toward the axis of the torch and a change in the arc voltage is compared with an arc length setting voltage so as to control the arc length control motor in response to the resulting difference signal to thereby maintain the arc length constant. At the same time the lifting block drive motor is controlled in accordance with the rotational angle of the arc length control motor so as to bring the position of the welding torch tip into coincidence with the center of rotation of the rotating block.

BRIEF DESCRIPTION OF THE DRAWINGS

FIG. 5 is a control block diagram for an embodiment of the method according to the invention.

FIG. 6 is a control block diagram for another embodiment of the method according to the invention.

DESCRIPTION OF THE PREFERRED EMBODIMENTS

Figure 1:
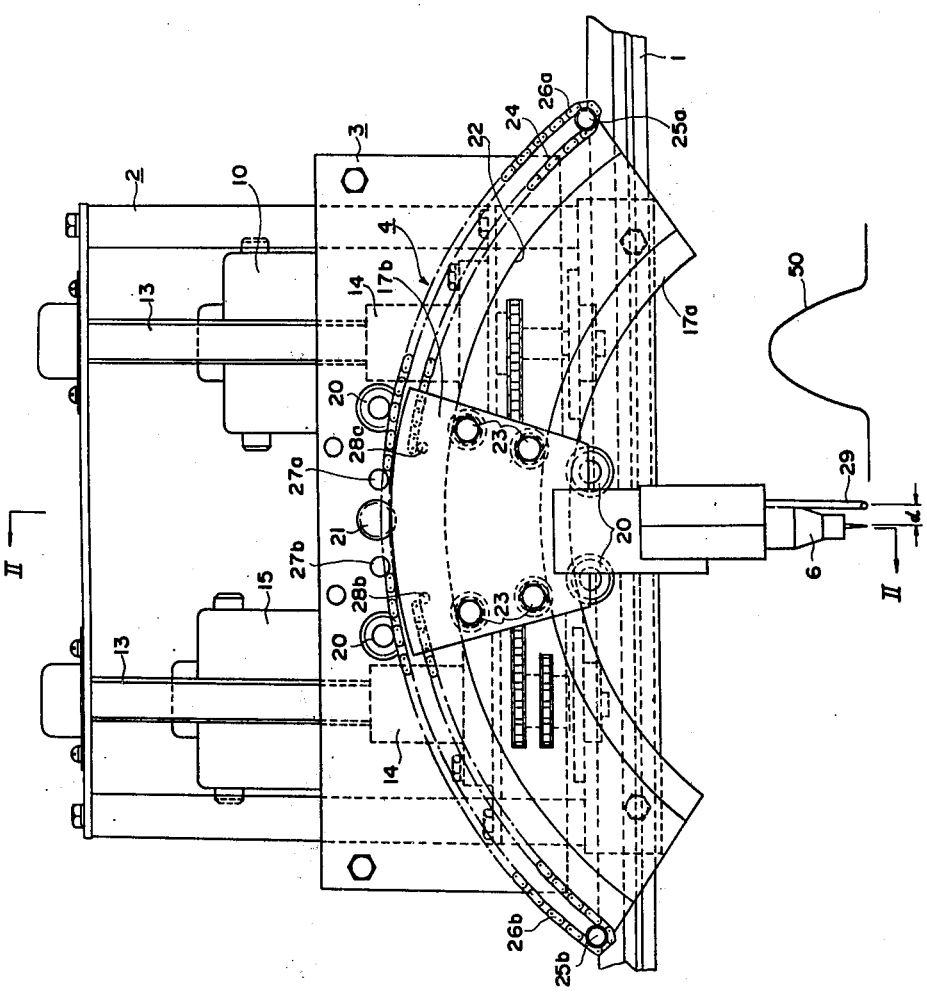
FIG. 1 is a front view showing an embodiment of an automatic welding apparatus for performing a method according to the invention.
Figure 2:
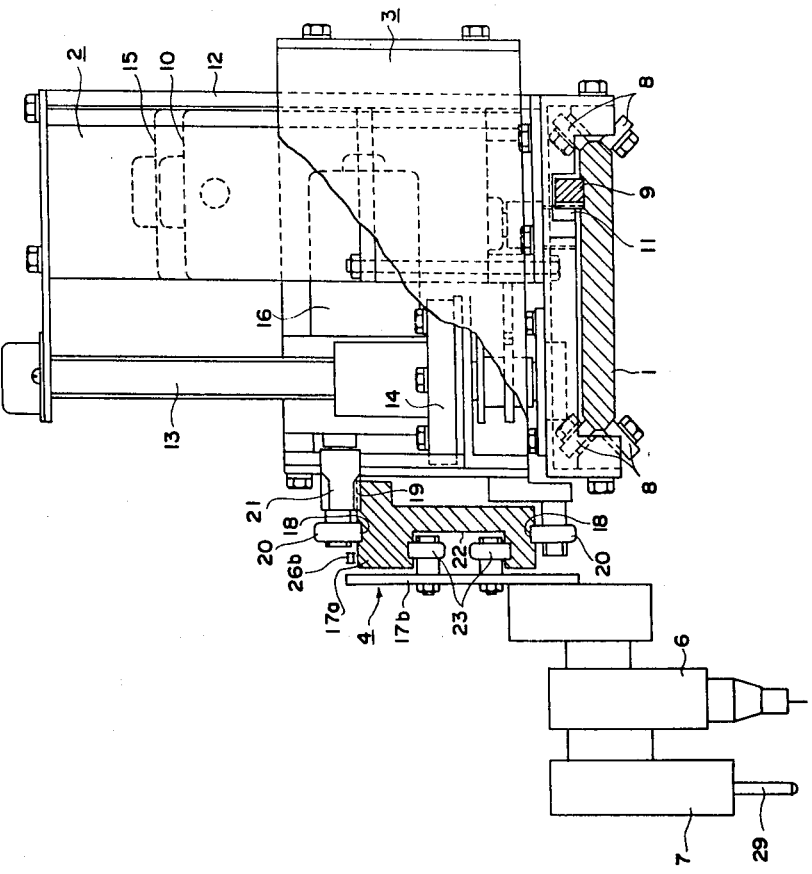
FIG. 2 is a view looked in the direction of the arrow line II—II of FIG. 1.

Referring now to FIGS. 1 and 2, a welding apparatus comprises a welding apparatus proper 2 which is movable along a rail 1 in the direction of an X axis or the horizontal direction, a lifting block 3 mounted on the welding apparatus proper 2 and movable in the direction of a Y axis or the vertical direction, a rotating block 4 mounted on the lifting block 3 and rotatable in a direction to adjust the oblique angle $\theta$ of a welding torch 6, the welding torch 6 mounted on the rotating block 4, and an obliquity detector 7 having a stylus 29 which is deviated from the welding torch 6 by a small amount d in the direction of the welding.

The welding apparatus proper 2 is mounted on the rail 1 by means of holding rolls 8, and mounted on the rail 1 to extend parallel thereto is a rack 9 which is engaged with a pinion gear 11 adapted to be rotated by a horizontal drive or X-axis motor 10 provided on the welding apparatus proper 2 whereby the apparatus proper 2 is movable along the rail 1 in the horizontal direction or the X-axis direction in response to the operation of the X-axis motor 10.

The lifting block 3 is movable up and down in the vertical direction (the Y-axis direction) along supports 12 of the apparatus proper 2 in response to the operation of a vertical drive or Y-axis motor 15 mounted on the lifting block 3 so as to drive female screws 14 which are in engagement with ball screws 13 fastened at the upper and lower ends thereof to the apparatus proper 2.

The rotating block 4 is rotated by a $\theta$-axis motor 16 mounted on the lifting block 3, and in the illustrated embodiment the rotating block 4 comprises an arc bent beam 17a, a welder head 17b, etc., so as to quickly rotate the welding torch 6 and the obliquity detector 7. The arc bent beam 17a is provided with guide grooves 18 formed in the top and bottom surfaces thereof and an arc rack 19 formed on the top surface and the beam 17a is supported on the lifting block 3 by means of supporting rolls 20 which are mounted on the lifting block 3 so as to be fitted in the guide grooves 18. Engaged with the arc rack 19 on the arc bent beam 17a is a pinion gear 21 which is driven by the $\theta$-axis motor 16 and thus the bent beam 17a is rotatable in response to the operation of the $\theta$-axis motor 16. The center of the pitch circle of the arc rack 19 and the center of arc of the guide grooves 18 correspond to the tip position of the welding torch 6 (more precisely the surface to be welded located in front of the tip position).

An arc hollow portion 22 is formed in the front surface of the bent beam 17a and supporting wheels 23 of the welder head 17b are fitted in the arc hollow portion 22 so as to support and move the head 17b in parallel to the pitch circle of the arc rack 19.

On the other hand, the bent beam 17a is formed with another arc guide grooves 24 which are formed in the top and front surfaces and sprockets 25a and 25b are provided at the side ends of the bent beam 17a which are located between the guide grooves 24. Chains 26a and 26b respectively extend around the sprockets 25a and 25b to run in the guide grooves 24, and the chains 26a and 26b have their one ends respectively fixed to fixed pins 27a and 27b which are vertically fitted on both sides of the pinion gear 21 on the front surface of the lifting block 3 and have their other ends respectively fixed to pins 28a and 28b which are fitted in the welder head 17b.

As a result, when the $\theta$-axis motor 16 is operated to rotate the pinion gear 21, while the bent beam 17a is rotated, the welder head 17b is rotated twice the rotation angle of the bent beam 17a due to the fact that the chains 26a and 26b supported on the bent beam 17a are fixed to the lifting block 3 at their one ends. In this way, the welder head 17b can be quickly rotated with the resulting reduction in the number of motors used.

The welding torch 6 and the obliquity detector 7 are integrally mounted to the welder head 17b.

The obliquity detector 7 includes the stylus 29 which is deviated by the small amount d from the welding torch 6 in the direction of the welding and it is made integral with the welding torch 6.

Figure 4:
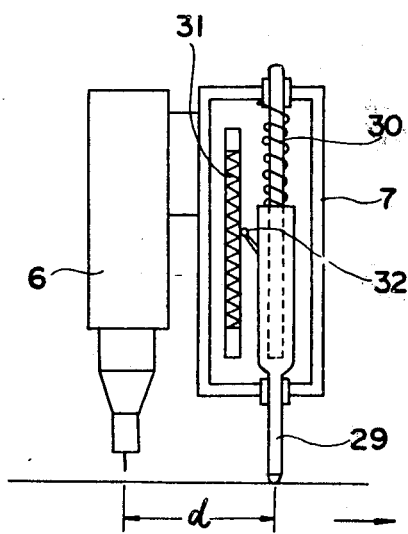
FIG. 4 is a schematic view showing an embodiment of an obliquity detector.

One of the important features of the method of this invention resides in the use of an obliquity detector having a single stylus whereby the difference in height between the stylus and the welding torch is utilized for controlling purposes. Referring now to the schematic diagram of FIG. 4 showing an embodiment of the obliquity detector 7, the detector 7 is integrally attached, along with the welding torch 6, to one side of the welder head 17b with respect to the direction of welding. The stylus 29 is mounted inside the obliquity detector 7 and the stylus 29 is pressed into contact with the materials to be welded under a fixed pressure applied by a spring 30 so as to be slidable in the axial direction of the welding torch 6. A ball is fitted in the tip of the stylus 29 so as to not scratch the materials to be welded. The stylus 29 is positioned ahead of the welding torch 6 with the small amount of deviation d in the direction of welding which is indicated by an arrow in FIG. 4. The obliquity detector 7 incorporates a potentiometer comprising a stationary member 31 fixed in a predetermined position relative to the welding torch 6 and a sliding member 32 attached to the stylus 29.

To use the welding apparatus equipped with this obliquity detector 7, it is so adjusted that the output of the obliquity detector 7 is reduced to zero when the welding torch 6 is maintained at a proper angle in relation to the flat surface portion. As a result, when the torch 6 comes across the slanted portion, the stylus 29 is raised or lowered so that there occurs a difference in height between the stylus 29 and the welding torch 6 and the obliquity detector 7 generates an output signal in accordance with the difference. In addition to a potentiometer of the above-described type, other means such as a differential transformer or limit switch or their combination may be used for the obliquity detector 7. FIG. 1 shows by way of example the profile of materials 50 to be welded.

Next, a first embodiment of the invention will be described in greater detail with reference to the control block diagram of FIG. 5.

It has been the practice with the arc welding method to automatically control the arc length. In the TIG welding, a welding power source having a DC drooping characteristic is generally used. In order that the welding heat input, welding arc output or the like may be maintained constant, it is necessary to maintain the current and voltage constant. If the arc current is set to a fixed value, there will exist a certain linear relation between the arc voltage and the arc length provided that the atmosphere gas, electrode diameter and electrode material are not changed. As a result, if the welding torch is moved so as to maintain the arc voltage constant, the arc length will be controlled automatically. Thus it has been the practice to mount the welding torch to the welding apparatus proper through vertical movement adjusting means whereby the voltage is detected and the welding torch is moved by means of the welding torch vertical movement adjusting means so as to make the voltage equal to a preset arc voltage and thereby to maintain the arc length at a constant value.

The welding apparatus is first moved horizontally on the rail 1 by the X-axis motor 10 to effect the welding of the flat portion and in this case the distance between the torch 6 and the materials 50 is controlled by applying the detected arc voltage to a comparator 44 to compare the same with a preset arc voltage corresponding to a preset arc length and applied from setting means 45, applying the resulting difference signal from the comparator 44 to a Y-axis motor controller 46 and controlling the Y-axis motor 15 through the Y-axis motor controller 46 so as to reduce the difference signal to zero. Consequently, the tip of the welding torch 6 is maintained at a predetermined distance which ensures the preset arc length between the welding torch 6 and the materials 50.

When the welding apparatus comes across the slanted portion of the materials 50, there occurs a difference in height between the welding torch 6 and the stylus 29 and the obliquity detector 7 generates an output corresponding to the difference. This output is compared by a comparator 36 with a preset torch angle applied to it from setting means 37 and the resulting comparison signal from the comparator 36 is applied to a $\theta$-axis motor controller 38 which in turn controls the operation of the $\theta$-axis motor 16 so as to reduce the difference signal to zero, that is, the $\theta$-axis motor 16 is operated so as to maintain the oblique angle of the welding torch 6 at a predetermined value.

The speed control in the X-axis direction is accomplished in accordance with the speed calculated from the angle $\theta_1$ of the welding torch 6 which was slanted from its position during the horizontal movement. In other words, in order to maintain the linear speed $V_W$ of the welding torch tip at a constant value, the speed in the X-axis direction at the slanted surface $\theta_1$ (the slanted surface corresponding to the torch angle $\theta_1$) must be selected $V_W \cos \theta$. As a result, the drive shaft of the $\theta$-axis motor 16 is coupled through a suitable reduction gear to an angle detector 39 comprising a rotating potentiometer or the like which generates an output $\cos \theta$, for example, and the thus generated output corresponding to $\cos \theta$ is applied to a multiplier 40. In the multiplier 40 the applied signal is multiplied by a signal corresponding to the preset speed signal $V_W$ applied from setting means 41 and in response to the output signal of the multiplier 40 an X-axis motor controller 42 operates the X-axis motor 10, thus maintaining constant the tip linear speed of the welding torch 6 at $V_W$.

By virtue of the construction described above, the method of this invention is advantageous in that the welding apparatus is reduced in weight and size and that it is possible by means of the simple construction to detect accurately the slanted or curved surface, maintain constant the oblique angle of the welding torch and the welding arc length and maintain a desired welding torch tip linear speed to thereby accomplish smoothly the welding of the corrugated portions of the metallic materials.

The method according to the above-described embodiment can be advantageously used for welding metallic materials having gradually curved surface portions. In this case of materials having sharply slanted curved surface portions, the method according to the below-mentioned embodiment can be used advantageously.

Figure 3:
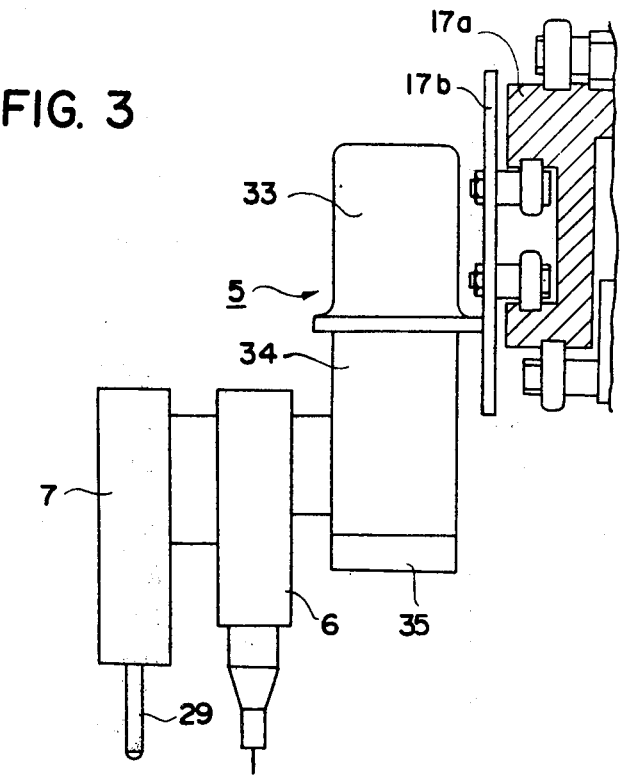
FIG. 3 is a partial side view showing another embodiment of the automatic welding apparatus.

The second embodiment will now be described. The welding apparatus used with the second embodiment is the same in construction with the counterpart used with the first embodiment except that the welding torch 6 and the obliquity detector 7 are attached to the welder head 17b by way of an arc length controlling drive block 5 as shown in FIG. 3.

The arc length controlling drive block 5 having attached thereto the welding torch 6 and the obliquity detector 7, comprises an arc length control motor 33, a controller 34 for adjusting the axial movement of the welding torch 6 and an arc length control motor rotation angle detector 35. The welding torch movement controller 34 is so designed that in response to the value resulting from a comparison between a detected arc voltage and a preset voltage the arc length control motor 33 is operated to vertically move the welding torch 6 in the axial direction thereof. The arc length control motor rotation angle detector 35 is responsive to the operation of the arc length control motor 33 so as to correct through the Y-axis motor 15 the deviation of the tip position of the welding torch 6 from the center of rotation of the bent beam 17a.

Next, the control method according to the second embodiment will be described in detail with reference to the control block diagram of FIG. 6.

The control of the $\theta$-axis motor 16 for maintaining the oblique angle of the welding torch 6 at a preset value and the control of the X-axis motor 10 for maintaining the tip linear speed of the welding torch 6 at a constant value are the same as in the case of the first embodiment and will not be described.

When the welding apparatus comes across the corrugated portion slanted at an oblique angle $\theta$, in order that the distance between the welding torch 6 and the materials 50 to be welded may be maintained constant, the welding torch 6 must be moved in the Y-axis direction at a linear speed of $V_W \sin \theta$. As a result, greater the angle $\theta$ and greater the welding speed, the torch movement in the Y-axis direction must be effected more rapidly with the resulting increase in the load on the Y-axis drive and danger of deteriorating the control quality. In accordance with the method of the second embodiment, although the arc length control drive block 5 is interposed between the welder head 17b and the welding torch 6 and the obliquity detector 7, the method is intended to eliminate any deterioration of the control quality in the welding of the corrugated portions with a sharp gradient and to allow the Y-axis control to follow the corrugated portions with a degree of accuracy which gives rise to no difficulty from a practical point of view.

In accordance with the method of the second embodiment, the difference signal from the comparator 44 is applied to an arc length control motor controller 47.

The arc length control motor controller 47 controls the operation of the arc length control motor 33 so as to reduce the difference signal to zero and thereby to control the tip of the welding torch 6 at the desired distance from the materials to be welded corresponding to the preset arc length.

While, in accordance with the method of this embodiment, the control of the distance between the welding torch 6 and the materials to be welded can be performed quickly with the resulting improvement on the control quality of the arc length, the tip of the welding torch 6 cannot coincide with the center of rotation of the bent beam 17a so that when the torch tip is shifted with a change in the welding torch angle, there is a great deal of complexity in correcting for the shift by the X and Y axis drives. As a result, the drive shaft of the arc length control motor 33 is coupled to the arc length control motor rotation angle detector 35 whose output angular signal is applied to a comparator 48. The comparator 48 also receives from setting means 49 a present angular signal corresponding to the coincidence between the welding torch tip and the center of rotation of the bent beam so that the comparator 48 compares the two signals and the resulting comparison signal from the comparator 48 is applied to the Y-axis motor controller 46. The Y-axis motor controller 46 controls the operation of the Y-axis motor 15 so as to reduce the difference signal to zero. Consequently, the tip of the welding torch 6 is brought into coincidence with the center of rotation of the bent beam 17a. This of course changes the arc and consequently the arc length control mechanism comes into operation so as to control the arc length.

While the above-described corrective controls at the two stages seemingly appears to be redundant, the arc length changes instantaneously thus requiring an early correction for the change and consequently the method of the second embodiment can be advantageously used for high speed welding purposes and in the welding operation of materials including portions having sharply changing inclinations.

It will thus be seen from the foregoing description that the present invention has a very great industrial utility in that the welding apparatus can be reduced in weight and size due to the fact that a single obliquity detector is used and operated and moreover it is possible by means of a simple construction to accurately detect the slanted or corrugated surface portions, maintain constant the oblique angle of the welding torch and the welding arc length and maintain a desired welding torch tip linear speed to thereby accomplish the welding smoothly.

We claim:

1. A method for welding corrugated metallic materials wherein a lifting block is vertically movably mounted on a welding apparatus proper which is movable in a horizontal direction on a track extending along a weld line and a rotating block carrying a welding torch is mounted on said lifting block, comprising the steps of:

mounting said welding torch to said rotating block by way of an arc length controlling drive block; comparing a change in an arc voltage with an arc length setting voltage; controlling an arc length control motor mounted on said arc length controlling drive block in response to a difference signal resulting from said comparison so as to maintain the arc length constant; controlling a lifting block drive motor in accordance with the rotational angle of said arc length control motor so as to bring the tip position of said welding torch into coincidence with the center of rotation of said rotating block; controlling a rotating block drive motor in response to signals from an obliquity detector disposed integrally with said torch and ahead thereof with respect to the direction of welding so as to maintain said torch at an angle corresponding to the oblique angle of the material to be welded; and controlling a welding apparatus proper traversing motor in response to a signal corresponding to said torch angle so as to maintain the welding speed constant.

* * * * *